3,792,030
PROCESS FOR THE POLYMERIZATION OF 1,2-DIMETHOXYETHYLENE
Norbert Vollkammer, Troisdorf, and Wilhelm Vogt, Cologne, Germany, assignors to Dynamit Nobel AG, Troisdorf, Germany
No Drawing. Filed Dec. 13, 1971, Ser. No. 207,648
Claims priority, application Germany, Dec. 18, 1970, P 20 62 400.4
Int. Cl. C08f 3/34
U.S. Cl. 260—91.1 R                               8 Claims

ABSTRACT OF THE DISCLOSURE

A process for the polymerization of 1,2-dimethoxyethylene using halogen containing organo aluminum compounds as polymer initiators is disclosed. The present process enables the preparation of polydimethoxyethylenes having molecular weights in excess of 60,000.

BACKGROUND OF THE INVENTION

It is known that 1,2-dimethoxyethylene (DMOE) can be polymerized with $BF_3$ etherate according to a cationic mechanism (S. S. Skorochodov, V. V. Stepanov; Vysokomol. Soedin, Ser. B 1969, 11 (5), 362).

Although DMOE, being a 1,3-disubstituted ethylene, has a lower reactivity in polymerization than, for example the likewise cationically polymerizable alkyl vinyl ethers, the polymerization takes place very energetically in substance, even at low temperature with intensive external cooling, and under these conditions, when $BF_3$ etherate is used as the initiator, it results in products of low molecular weight having a brownish black discoloration. The polymerization of DMOE has therefore been performed hitherto at temperatures below 0° C., preferably at —78° C., in the presence of an organic solvent for both the monomer and the polymer, such as toluene, dialkyl ethers or methylene chloride. Another disadvantage of the $BF_3$ etherate that is used is that the results (polymerization speeds, transformations and molecular weights) are reproducible only with great difficulty. Like the other Friedel-Crafts catalysts, this catalyst has the disadvantage that the polymerization is often very difficult to start, even when great concentrations of initiator are used. It is for this reason that $BF_3$ etherate concentrations of up to 12 molepercent, with reference to the monomer, are used according to the literature. As a result of the high catalyst concentration, the progress of the polymerization, once it has been started, may be very violent and result in greatly discolored products. The polydimethoxyethylenes thus obtained are of low molecular weight: according to the literature molecular weights no higher than 30,000 are obtained. In spite of the high initiator concentration transformations barely higher than 80% are achieved. When the $BF_3$ etherate concentration is lower (3.6 molepercent), the polymerization speed is very low: in a 50% solution (methylene chloride) a transformation of only 41% is achieved in 48 hours. The polydimethoxyethylenes obtained under these conditions are described on the basis of X-ray analysis as amorphous.

The above disadvantages are avoided when the initiators of the invention as well as the polymerization process of the invention are used.

DESCRIPTION OF THE INVENTION

The subject of the invention is a process for the polymerization of 1,2-dimethoxyethylene, which is characterized by the fact that halogen-containing organic aluminum compounds of the sum formula $Al(R)_mX_n$ are used as polymerization initiators, R being a saturated aliphatic, branched or unbranched hydrocarbon radical with 1 to 6 carbon atoms or phenyl, X is a halogen such as chlorine or bromine, m and n represent the numbers 1, 1.5 or 2, and the sum of m and n is the number 3. In addition, mixtures of these organo aluminum compounds such as dimeric organo aluminum sesqui-halides can also be used.

Examples of preferred initiators are: dimethylaluminum chloride, dimethylaluminum bromide, diethylaluminum chloride, diethylaluminum bromide, diisobutylaluminum chloride, methylaluminum sesquichloride, ethylaluminum dichloride, ethylaluminum sesquichloride, phenylaluminum dichloride and diphenylaluminum chloride.

The initiators of the invention have a number of advantages over $BF_3$ etherate: the polymerization results are very well reproducible as regards transformations and molecular weights. Virtualy quantitative transformations can be obtained, as well as previously unknown high molecular weights.

Still another subject of the invention, therefore, is polymers of 1,2-dimethoxyethylene with the repetitive unit:

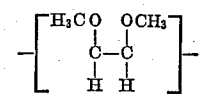

and with molecular weights in excess of 60,000.

The course of the polymerization with the use of the organic aluminum compounds is very controllable, because the speed of polymerization is only slightly dependent upon the initiator concentration and the temperature. Whereas with $BF_3$ etherate controlled polymerization is possible only in dilute solutions, it is possible, when the organic aluminum compounds of the invention are used, to polymerize in an organic dispersion, which offers advantages as regards polymerization speed, molecular weights and especially the refinement of the polymers after interruption of the polymerization.

It has been found that DMOE is very difficulty soluble in aliphatic hydrocarbons in the temperature range $\leq -30°$ C. The monomer can thus be polymerized in suspension to special advantage by the use of the organometallic compounds, and low-boiling liquid hydrocarbons such as propane or butane are preferred as suspension agents for the monomer. In this case the polyDMOE is immediately produced in a rubber-like form and can easily be obtained after removal of the suspension agent by evaporation.

The ratio of the monomer to the suspension agent is best from 1:2 to 1:3. If the ratio is substantially higher (say, 1:1), the polymerization still takes place under good control, but products of low molecular weight are formed and the transformation is not improved.

The quantity of the initiators advantageously amounts to between 0.1 and 10 mole-percent, and it is preferably between 1 and 6 mole-percent with reference to the monomers.

The polymerization temperature can be between 0° and —80° C., and it is preferably between —30 and —60° C.

The most advantageous polymerization temperature is between —40 and —55° C. In spite of the melting point of the monomer (85–90% cis-DMOE and 15–10% trans-DMOE) of about —30° C., it is possible to keep the DMOE dispersed in liquid form at —50° C. until the initiator is added. For safety's sake (to prevent premature crystallization), a small amount (say, 2%) of trimethoxyethane can be added to lower the freezing point. The addition of trimethoxyethane does not have a negative influence on the transformation and molecular weight. Temperatures substantially lower than —60° C. can be used with only difficulty reproducible results because the danger exists that the monomer might crystallize out before the initiator is added and the polymerization has begun. Polymerization temperatures higher than −40° C. have a decided effect on the molecular weights of the products obtained; thus the selection of the temperature offers a simple way of controlling the molecular weight.

The polymerization speed and the final transformation are not greatly dependent upon the initiator concentration, but the molecular weights are more greatly affected thereby. At an initiator concentration of 5 mole-percent with reference to the monomer the molecular weights attain the highest values.

The polymerization time, under the polymerization conditions described above, is between 2 and 4 hours. It is best for the course of the polymerization to be such that, at −50° C. in a propane or butane suspension, most of the polymer (80%–85%) is obtained in 1 to 2 hours of reaction time, and then, after the evaporation of the suspending agent at −45 and 0° C., respectively, the batch continues to be polymerized at the latter temperature (virtually in substance) down to the final degree of transformation. The polymerization is terminated by destroying the catalyst by the addition of alcohol.

The DMOE monomer was obtained from trimethoxyethane by splitting off methanol catalytically in the gaseous phase and consisted, on the basis of gas chromatography, of 85 to 90% cis-DMOE and 10 to 15% trans-DMOE.

The polydimethoxyethylenes obtainable by the invention are colorless, in contrast to the products prepared with $BF_3$ etherate.

The molecular weights (osmotic numerical average) amount to from 60,000 to 350,000 and more. Polymers with molecular weights of 80,000 to 270,000 are preferred for a number of applications.

As molecular weight comparisons of the numerical average values with the weight average values show, they have a narrow molecular weight distribution.

As X-ray diagrams show, the polydimethoxyethylenes obtainable by the process of the invention have a definite crystallinity, the crystalline percentage being about 10%. In contrast, the polymers obtained with $BF_3$ etherate are described in the literature as amorphous.

Furthermore, as shown by measurements of nuclear magnetic resonance, there are definite differences of tacticity in comparison with the polydimethoxyethylenes obtained with $BF_3$ etherate. While the percentage of isotactic sequences is the same in both polymerizations, the syndiotactic sequences in the polydimethoxyethylenes prepared with the organic aluminum compounds is greater, at the expense of the heterotactic sequences, than it is in a polyDMOE obtained with $BF_3$ etherate.

The polydimethoxyethylenes obtained with the organic aluminum initiators display a substantial improvement in thermal stability of shape according to Vicat. The Vivat temperature (DIN 53,460, in air) is more than 30° C. higher than it is in a polydimethoxyethylene prepared with $BF_3$ etherate.

The polymers prepared are soluble in water. It is possible to make them into tear-resistant sheets, with the addition, if desired, of plasticizers such as polyethylene glycol or polypropylene glycol, so that bags can be made of them which are to dissolve in water.

The molecular weights of the polydimethoxyethylenes were determined by membrane osmosis as well as by gel chromatography; otherwise the molecular weights were determined on the basis of the equation $$[\eta]\left(\frac{ml.}{g.}\right) = 5.6 \cdot 10^3 \cdot \overline{M}n^{0.84}$$

which has been formulated for unfractionated polydimethoxyethylenes.

The viscosimetric measurements were performed in water at 20° C. and at a concentration of 0.01 g./ml.

The following examples are intended to further explain the invention.

EXAMPLE 1

In a wide-necked reaction vessel with a 500 ml. capacity, provided with a stirrer, thermometer and gas inlet and outlet tubes, and externally refrigerated to −50° C., 91.7 g. (100 ml.) = 1.04 moles of 1,2-dimethoxyethylene (90% cis and 10% trans isomers) dried over sodium hydroboride were placed after the air had been removed by displacement with a current of dry nitrogen. Then, at −50° C., 250 ml. of dry propane was condensed into the vessel and the monomer was dispersed in droplet form in the hydrocarbon by intense agitation. Then 6.24 g. (0.052 mole) of aluminum diethyl monochloride in the form of a 30 wt.-percent solution in petroleum ether was added to the contents of the vessel. The amount of initiator is 5 mole-percent with reference to the monomer. The polymerization starts immediately, manifesting itself in the precipitation of a soft, plastic mass of polymer. The batch is polymerized for 2 hours at −50° C.; then the suspension agent is removed by evaporation at −45° C. and the batch is further polymerized at this temperature for an additional hour.

By the addition of 10 ml. of ethanol the catalyst is destroyed and the colorless, rubber-like polydimethoxyethylene is freed under a vacuum of residual monomer and any adhering suspension agent, whereupon the polymer becomes hard. It is refined by dissolving in water at room temperature and precipitation by heating the aqueous solution to 65° C. 88.6 g. of polydimethoxyethylene are obtained; the transformation is 96.6%. The polymer has a reduced specific viscosity in water of 472 ml./g. and an osmotic molecular weight of 255,000.

A film cast from a methanol solution of the polymer displayed a decided crystallinity in the X-ray diffraction diagram, the crystallinity being estimated at 10%.

A sheet of the material of Example 1 in a thickness of 0.18 mm. and having a moisture content of about 2% has a tensile strength of 500 kp./cm.$^2$ and an elongation at rupture of 4.8%.

On the other hand, no mechanically stable sheet could be produced at all from a product having a molecular weight of 35,000 which had been prepared with $BF_3$-etherate on the basis of information given in the literature (S. S. Skorochodov, loco citato).

EXAMPLES 2 AND 3

Using the same working technique as in Example 1, under otherwise identical polymerization conditions, 150 ml. (Example 2) and 400 ml. (Example 3) of propane were used as suspension agents, so that the ratio of monomer to suspension agent was 1:1.5 (Example 2) and 1:4 (Example 3).

Transformations of 95.8% (Example 2) and 77.0% (Example 3) were obtained. The reduced specific viscosities amounted to 160 ml./g. and 242 ml./g., respectively, and the osmotic molecular weights were 95,000 (Example 2) and 135,000 (Example 3).

EXAMPLES 4, 5, 6 AND 7

In the same manner as in Example 1, 91.7 g. (100 ml.) = 1.04 moles of DMOE were dispersed in each case in 250 ml. of liquid propane at −50° C. and polymerized at −50° C. with varying concentrations of aluminum diethyl monochloride. The polymerization time totaled 3 hours in all cases.

| Example | Initiator concentration, mole-percent | Polymer in grams | Transformation, percent | $n_{sp.o}$ ml./g. | Molecular weight (osmotic) |
|---|---|---|---|---|---|
| 4 | 1.5 | 58.6 | 64 | 245 | 140,000 |
| 5 | 2.5 | 86.4 | 94 | 294 | 165,000 |
| 6 | 3.5 | 87.7 | 95 | 375 | 205,000 |
| 7 | 8.5 | 89.2 | 97 | 170 | 100,000 |

A sheet prepared from the polydimethoxyethylene of Example 5 (molecular weight 165,000) with 2% atmospheric moisture has a tensile strength of 400 kp./cm.² and an elongation at rupture of 2.5%.

The molecular weights of the polydimethoxyethylenes of Examples 4 and 7 were also determined by gel permeation chromatography. The osmotic values of 140,000 and 100,000 compare with gel chromatography values of 200,000 and 113,000, respectively, which indicates a narrow molecular weight distribution.

A plate pressed from the material of Example 4 prepared at 120° C. press temperature and at a cooling rate of approximately 20° C. per minute shows a decided crystallinity in the X-ray diffraction diagram (approximately 10% crystallinity).

For a comparison of the tacticity and Vicat stability of shape of a polydimethoxyethylene obtained in accordance with the invention (product from Example 5) with a product prepared with $BF_3$ etherate, a polydimethoxyethylene with a molecular weight of 35,000 was synthesized in accordance with information given in the literature (S. S. Skorochodov, loc. cit.).

In the NMR spectrum (Varian A-60), the proton signals for syndiotactic sequences appear at $\delta=3.74$ p.p.m., for isotactic sequences they appear at $\delta=3.30$ p.p.m., and for heterotactic sequences they appear at $\delta=3.62$ p.p.m. Integration of the signals gives the following sequence distribution:

| Initiator | $BF_3$ etherate | $Al(C_2H_5)_2Cl$ |
| --- | --- | --- |
| Isotactic sequences, percent | 20 | 20 |
| Syndiotactic sequences, percent | 10 | 30 |
| Heterotactic sequences, percent | 70 | 50 |

The polydimethoxyethylene obtained with the organic aluminum compound is of appreciably higher tacticity.

The difference in tacticity has a beneficial influence on the Vicat stability of shape (DIN 53,460). While the poly-DMOE prepared with $BF_3$ etherate has a Vicat temperature of 42° C., that of the poly-DMOE obtained with $Al(C_2H_5)_2Cl$ is 75° C. Both of these figures apply to poly-DMOE without any moisture content; the absorption of approximately 3% atmospheric moisture lowers the Vicat temperature by 40° C. in each case.

EXAMPLE 8

20 g. (0.23 mole) of DMOE was placed in a 250 ml. wide-necked reaction flask equipped with stirrer, thermometer and gas inlet and outlet tube, after displacement of the air by dry nitrogen, and then 50 ml. of butane was condensed into the flask at −30° C. The monomer was distributed in droplet form into the suspension agent by intense agitation, and 1.38 g. (0.012 mole) of $Al(C_2H_5)_2Cl$ in petroleum ether as diluent (30% solution) was added. The initiator concentration amounted to 5 mole percent. After 3 hours the polymerization is interrupted and the initiator destroyed by the addition of 5 ml. of ethanol. The suspension agent was removed by evaporation at room temperature and the polymer was freed of residual monomer and adhering suspension agent. 16 g. of poly-DMOE was obtained; the transformation was 80%. The reduced specific viscosity amounted to 156 ml./g., and the molecular weight was 95,000. A sheet of the material 0.28 mm. thick cast from a methanol solution had a tensile strength of 125 kp./cm.² and an elongation at rupture of 2%, at a moisture content of 2%.

Similar results were obtained by the use of equivalent amounts of $Al(CH_3)_2Cl$ and $Al(i-C_4H_9)_2Cl$ instead of $Al(C_2H_5)_2Cl$.

EXAMPLE 9

18 g. (0.21 mole) of DMOE was placed in a polymerization vessel with a capacity of 250 ml., after removal of the air by displacement with dry nitrogen, and 50 ml. of propane was condensed into the vessel at −50° C. The ratio of monomer to suspension agent was 1:2.5. 1.33 g. (0.0105 mole) of aluminum monoethyl dichloride was added to the dispersed monomer and the batch was polymerized at −50° C. The initiator concentration, with reference to the monomer, amounted to 5 mole percent. The course of the polymerization is no different from that of the batches started with $Al(C_2H_5)_2Cl$. After 2 hours the propane was evaporated away at −45° C., the batch was allowed to polymerize further at this temperature for another hour, and the initiator was destroyed by the addition of 2 ml. of ethanol. After the poly-DMOE primarily produced in rubber-like form was dried, 16.1 grams of a hard product was the result. The transformation percentage was 88%. The polymer had a reduced specific viscosity of 290 ml./g. and a molecular weight of 163,000.

EXAMPLE 10

Using the same procedure and the same polymerization conditions as in Example 9, aluminum sesquichloride $(Al_2(C_2H_5)_3Cl_3)$ is used as the initiator in Example 10. Amount of initiator: 0.5 g. 18.2 g. of polydimethoxyethylene is obtained, which corresponds to a virtually quantitative transformation. The polymer has a reduced specific viscosity of 180; the molecular weight amounts to 108,000.

EXAMPLE 11

Using the procedure of Example 9, but polymerizing at −45° C., phenylaluminium dichloride in an amount of 1.4 g. is used as the initiator instead of aluminium monoethyl dichloride. Polymerization process and resulting polymer were found corresponding as specified in Example 9.

What is claimed is:

1. A process of polymerizing 1,2-dimethoxyethylene which comprises contacting 1,2-dimethoxyethylene at a temperature in the range of 0 to −80° C. with an initiator in an amount between 0.1 and 10 mole percent based upon said 1,2-dimethoxyethylene, which is of the group of halogen-containing organo aluminum compounds having the formula:

$$Al(R)_m X_n$$

wherein

R is a saturated aliphatic radical of from 1 to 6 carbon atoms, or phenyl,

X is chlorine or bromine, m and n are each 1, 1.5 or 2, the sum of m and n being 3.

2. The process of claim 1 in which the initiator is dimethylaluminum chloride, dimethylaluminum bromide, diethylaluminum chloride, diethylaluminum bromide, diisobutylaluminum chloride, methylaluminium sesquichloride, ethylaluminum dichloride, ethylaluminum sesquichloride, phenyl aluminium dichloride or diphenylaluminium chloride.

3. The process of claim 1 in which the initiator is present in an amount of from about 1 to 6 mole percent and the polymerization is carried out at temperatures of from about −30° to −60° C.

4. The process of claim 3 in which the polymerization is carried out at temperatures of from about −40° to −55° C.

5. The process of claim 1 in which the polymerization takes place in a suspension of a liquid hydrocarbon.

6. The process of claim 5 in which the hydrocarbon is selected from the group consisting of propane, butane and mixtures thereof.

7. A water-soluble homopolymer dimethoxyethylene having the recurrent unit
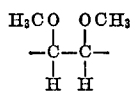
and an osmotic average number molecular weight between about 60,000 and 350,000, said polymer having a crystallinity of about 10%.
8. The polymers of claim 7 having a molecular weight of from about 80,000 to 270,000.
References Cited
UNITED STATES PATENTS
2,526,743 10/1950 Gresham _____ 260—91.1 R
3,231,554 1/1966 Kern _____ 260—91.1 M
HARRY WONG, Jr., Primary Examiner
U.S. Cl. X.R.
260—29.6 R, 33.4 R, 91.1 A

UNITED STATES PATENT OFFICE
CERTIFICATE OF CORRECTION

Patent No. 3,792,030　　　　Dated February 12, 1974

Inventor(s) Norbert Vollkommer and Wilhelm Vogt

It is certified that error appears in the above-identified patent and that said Letters Patent are hereby corrected as shown below:

Col. 1, line 26

"1,3" should be "1,2"

Col. 1, line 50

"violet" should be "violent"

Col. 3, line 55

"Vivat" should be "Vicat"

Col. 3, line 70

"$5.6 \cdot 10^3$" should be "$5.6 \cdot 10^{-3}$"

Signed and sealed this 24th day of September 1974.

(SEAL)
Attest:

McCOY M. GIBSON JR.
Attesting Officer

C. MARSHALL DANN
Commissioner of Patents